United States Patent [19]

King

[11] Patent Number: 5,204,985
[45] Date of Patent: Apr. 20, 1993

[54] HOUSING FASTENER AND POWER SOURCE CONTACT

[75] Inventor: Jeffrey S. King, Boynton Beach, Fla.

[73] Assignee: Motorola, Inc., Schaumburg, Ill.

[21] Appl. No.: 532,775

[22] Filed: Jun. 4, 1990

[51] Int. Cl.⁵ .......................... H04B 1/16; H04B 1/08
[52] U.S. Cl. ...................................... 455/343; 455/90; 455/348; 455/349
[58] Field of Search ............... 455/347, 348, 349, 128, 455/90, 343, 127; 439/683, 684, 500; 354/288 E

[56] References Cited

U.S. PATENT DOCUMENTS

| | | | |
|---|---|---|---|
| 3,105,938 | 10/1963 | Onnigain et al. | 455/128 |
| 4,631,640 | 12/1986 | Umetsu et al. | 361/422 |
| 4,641,370 | 2/1987 | Oyamada | 455/348 |
| 4,786,889 | 11/1988 | Hayasaka | 340/311.1 |
| 4,991,225 | 2/1991 | Holcomb et al. | 455/343 |
| 5,109,539 | 4/1992 | Inubushi et al. | 455/349 |

Primary Examiner—Reinhard J. Eisenzopf
Assistant Examiner—Christine K. Belzer
Attorney, Agent, or Firm—Jose Gutman; William E. Koch; Thomas G. Berry

[57] ABSTRACT

An electronic device (100) includes electrical circuits (208) and a power source (101) having at least one terminal for providing power to the electrical circuits (208). A housing has first and second members (302,304) constructed to cooperatively interconnect to substantially enclose the electrical circuits (208), the housing further being adapted to receive and mechanically couple with the power source (101). An electrical contact strip (220) electrically couples the electrical circuits (208) and the power source (101), and fastens the first and second members (302,304) of the housing together. The electrical contact strip (220) includes a spring indentation (314) mechanically coupled to the at least one terminal of the power source (101) to provide mechanical securing force between the power source (101) and the housing. The electrical contact strip (220) also includes a first opening. The first and second members (302,304) of the housing include second and third openings. The first, second and third openings are arranged to cooperatively receive a fastener (300) for fastening the first and second members (302,304) of the housing together.

6 Claims, 2 Drawing Sheets

HOUSING FASTENER AND POWER SOURCE CONTACT

FIELD OF THE INVENTION

This invention relates in general to the field of electrical contacts for electronic devices, and more specifically to those electrical contacts which are mechanically coupled to a housing and electrically coupled to an energy source.

BACKGROUND OF THE INVENTION

The construction of many modern electronic devices (e.g., selective call receivers), demands ease of portability while providing protection from mechanical shocks and abuse. The housings of such devices typically comprises at least two housing members which are secured together to enclose and protect internal electronic circuitry. Additionally, a power source, such as a battery, is necessarily incorporated within. The housing oftentimes is fastened together with some form of fastener, such as one or more threaded machine screws. The screws usually mate with corresponding threaded metal inserts located within the housing and mechanically coupled therethrough. For a more detailed description of the construction of conventional selective call receivers, reference is made to U.S. Pat. No. 4,631,640 and U.S. Pat. No. 4,786,889, both assigned to the same assignee, and the teachings of which are hereby incorporated by reference.

The mechanical stress endured during normal operation of many of these electronic devices, such as selective call receivers, typically requires metal fastening devices to secure the housing members together which protect the internal electrical components and power source. Conventional selective call receiver designs require a metal insert which is typically enclosed within the housing and mechanically coupled to the internal housing via a circuit carrying substrate (e.g., a printed circuit board). The metal insert typically mates with a metal screw, which is inserted through the housing to fasten the housing members together.

The power source for such electronic devices typically is some form of battery which is secured within the housing in a battery compartment. The battery normally electrically couples with at least one electrical contact, to provide power for operating the electrical circuits. The electrical contact normally is also coupled to the circuit carrying substrate.

Unfortunately, the two functions of fastening the housing members together and providing electrical coupling between the power source and the electrical circuits are currently performed by two separate mechanical structures. This adds cost and reduces the quality of the electronic device in a number of ways. First, the added piece parts increase product cost. Second, additional manufacturing and assembly steps are required. For example, the metal insert typically must be attached to a circuit carrying substrate via a soldering operation. The battery contact must also go through this process. Lastly, additional piece parts and manufacturing process steps increase opportunities for introducing defects into the product. This increases the number of overall manufacturing defects and reduces quality as viewed by the consumer of the final product.

In carrying out one form of this invention, there is provided an electronic device comprising electrical circuits, a power source having at least one terminal for providing power to the electrical circuits a housing having first and second members constructed to cooperatively inter-connect to substantially enclose the electrical circuits, the housing further being adapted to receive and mechanically couple with the power source, and an electrical contact strip for electrically coupling the electrical circuits and the power source, and for fastening the first and second members of the housing together. The electrical contact strip includes a spring indentation mechanically coupled to the at least one terminal of the power source to provide mechanical securing force between the power source and the housing. The electrical contact strip also includes a first opening. The first and second members of the housing include second and third openings. The first, second and third openings are arranged to cooperatively receive a fastener for fastening the first and second members of the housing together.

DESCRIPTION OF A PREFERRED EMBODIMENT

Figure 1:
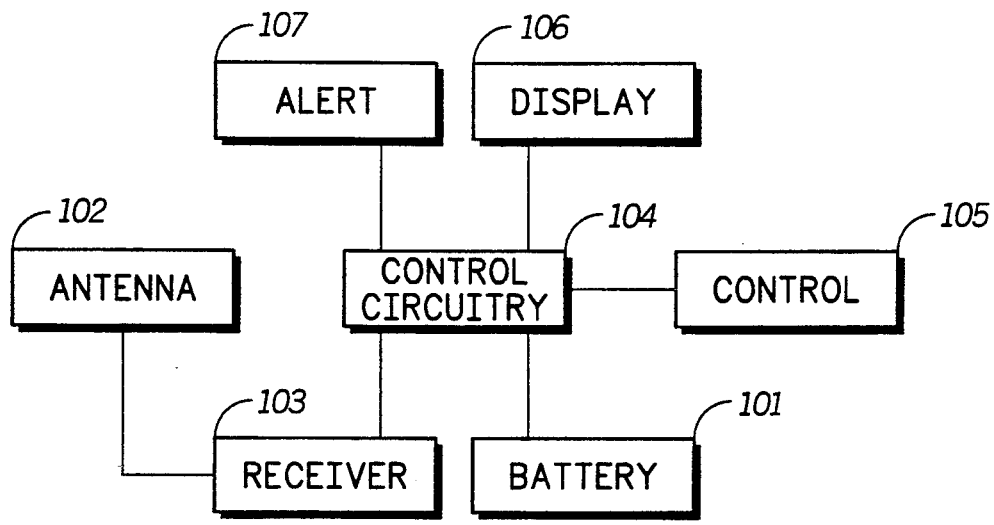
FIG. 1 is a block diagram of a selective call receiver.

Referring to FIG. 1, a battery (101) powered selective call receiver 100 operates to receive a signal via an antenna 102. The received signal is routed from the antenna 102 to a receiver 103. The receiver 103 demodulates the received signals using conventional techniques and forwards the demodulated signal to a control circuit 104, which decodes and recovers information contained within the received signal. In accordance with the recovered information and user operated controls (105), the selective call receiver presents at least a portion of the information, such as by a display 106, and signals the user via an audible or sensible alert 107 that a message has been received. The user may then view the information presented on the display 106.

The control circuit 104 shown in FIG. 1 preferably includes signal multiplexing integrated circuits, a microcomputer, a digital memory coupled to the microcomputer, environmental sensing circuitry such as for light or temperature conditions, audio power amplifier circuitry, control interface circuitry, and display illumination circuitry. These elements are arranged in a known manner which when assembled provides the display information receiver as requested by the customer.

Figure 2:
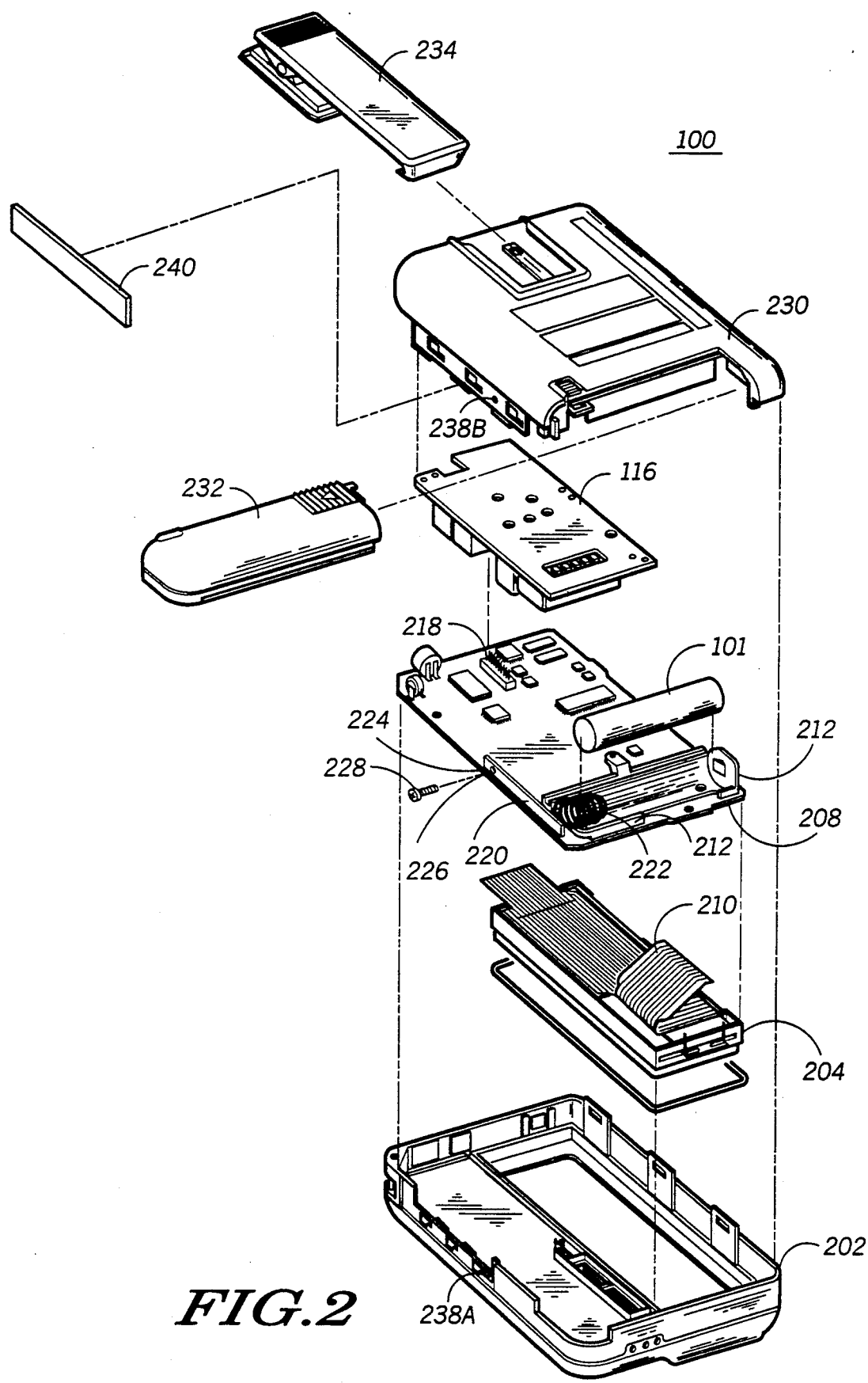
FIG. 2 is an exploded view of a housing in accordance with an embodiment of the present invention.

Referring to FIG. 2, the selective call information display receiver 100 is shown in an exploded, perspective view in accordance with an embodiment of the present invention. A front housing member 202 receives a display assembly 204, which is also coupled to a circuit supporting substrate or printed circuit (PC) board 208 via a flex circuit 210 using known techniques.

The PC board 208, in the preferred embodiment, is constructed to receive a battery holder 212 and battery 101 to provide power for the selective call receiver 100 via electrical contact 220. A spring 222 portion of the electrical contact 220 maintains a positive mechanical connection with the battery 101, while another portion of the electrical contact 220 is coupled 224 to the PC board 208 using known techniques. The electrical contact 220 also has an opening 226 for receiving a threaded machine screw 228 during the final assembly of the front 202 and back 230 housing members. Preferably, the opening 226 is made using known lancing techniques. Also, a receiver assembly 216 mates to the PC board 208 via connector 218.

The back housing 230 is constructed to provide a removable battery door 232 to facilitate replacing the battery 101. A removable belt clip 234 attaches to the back housing 230 in a known manner, allowing ease in portability by the user of the selective call receiver 100.

Both the front 202 and back 230 housing members include openings 238A and 238B, respectively, which allow the machine screw 228 to fasten the assembled housing members via the opening 226 in the electrical contact 220. Preferably, a protective cover 240 shields the machine screw 228 and housing fastening arrangement (238A, 238B, and 226) from the external environment. With such an arrangement, the electrical contact 220 forms a retaining means for fastening the front 202 and back 230 housing members together while contemporaneous serving as one of the battery contacts 220. This arrangement operates to secure and protect the internal electrical components and the power source.

Figure 3:
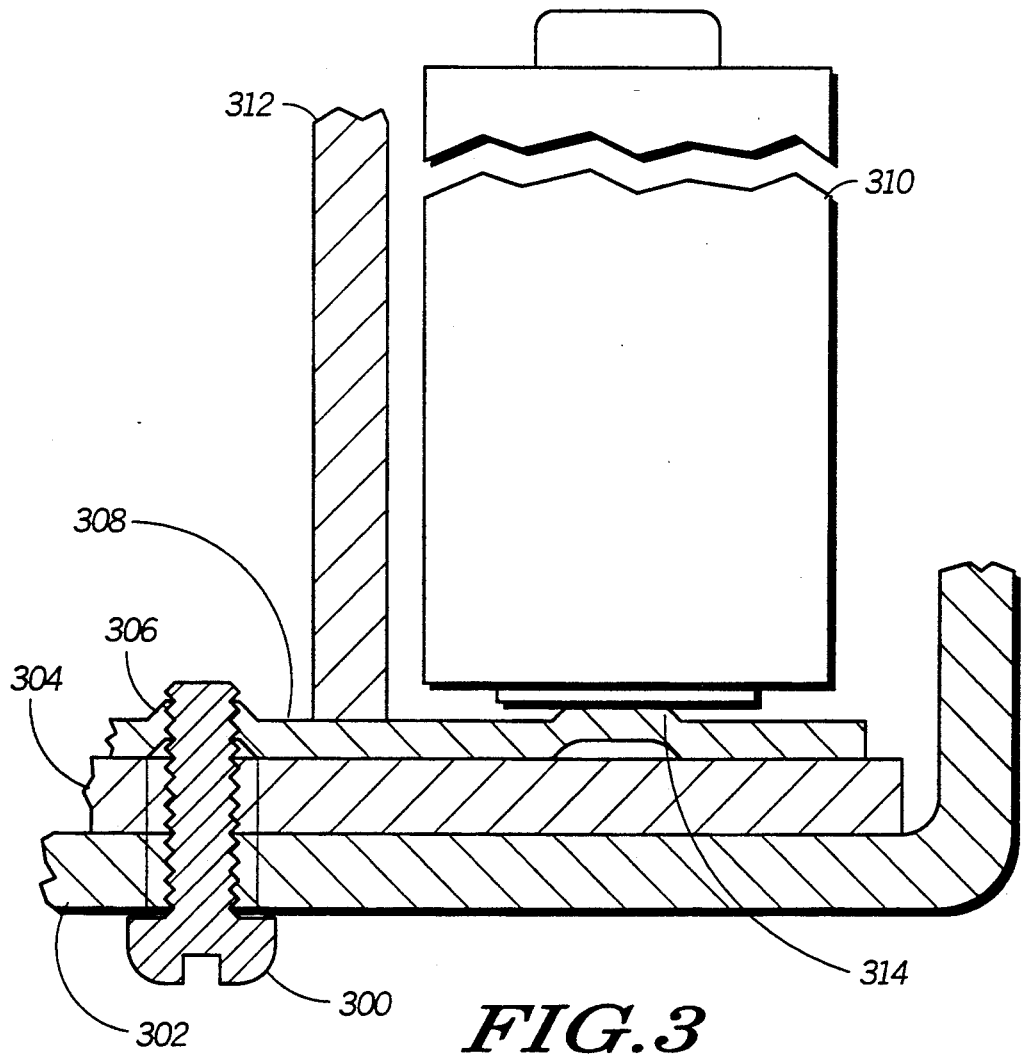
FIG. 3 is a cross-sectional view of a housing according to an alternate embodiment of the present invention.

Referring to FIG. 3, a cross-sectional view of an alternate embodiment of the present invention reveals a threaded machine screw 300 fastening first 302 and second 304 housing members together via an opening 306 in an electrical contact 308. Preferably, the opening 306 is made using known lancing techniques. The electrical contact 308 also serves to electrically couple the negative terminal of a battery 310, secured within battery holder 312 to a printed circuit board (not shown). A spring 314 indentation in the electrical contact 308 provides positive mechanical connection with the battery 310 terminal. This alternate arrangement also utilizes the housing fastening means as one of the battery terminals 308 thereby reducing the number of components in the device.

I claim:
1. An electronic device, comprising:
   electrical circuits;
   a power source having at least one terminal for providing power to the electrical circuits;
   a housing having first and second members constructed to cooperative inter-connect to substantially enclose the electrical circuits, the housing further being adapted to receive and mechanically couple with the power source; and
   an electrical contact strip for electrically coupling the electrical circuits and the power source, and for fastening the first and second members of the housing together, the electrical contact strip including a spring indentation mechanically coupled to the at least one terminal of the power source to provide mechanical securing force between the power source and the housing, and the electrical contact strip including a first opening, and the first and second members of the housing including second and third openings, the first, second and third openings being arranged to cooperatively receive a fastener for fastening the first and second members of the housing together.

2. The electronic device of claim 1, wherein the power source is a battery.

3. The electronic device of claim 2, further comprising a battery holder substantially enclosed within the housing and mechanically coupled thereto, the spring indentation of the electrical contact strip arranged with the battery holder for receiving the battery into the battery holder, mechanically contacting the at least one terminal of the battery, and providing mechanical securing force between the battery and the battery holder.

4. A selective call receiver, comprising:
   electrical circuits, including:
      a receiver for receiving and demodulating a signal;
      a decoder electrically coupled to the receiver for decoding information contained within the received signal, including a message; and
      presenting means electrically coupled to the decoder for presenting the message to a user;
   a power source having at least one terminal for providing power to the electrical circuits;
   a housing having first and second members constructed to cooperatively inter-connect to substantially enclose the electrical circuits, the housing further being adapted to receive and mechanically couple with the power source; and
   an electrical contact strip for electrically coupling the electrical circuits and the power source, and for fastening the first and second members of the housing together, the electrical contact strip including a spring indentation mechanically coupled to the at least one terminal of the power source to provide mechanical securing force between the power source and the housing, and the electrical contact strip including a first opening, and the first and second members of the housing including second and third openings, the first, second and third openings being arranged to cooperatively receive a fastener for fastening the first and second members of the housing together.

5. The selective call receiver of claim 4, wherein the power source is a battery.

6. The selective call receiver of claim 9, further comprising a battery holder substantially enclosed within the housing and mechanically coupled thereto, the spring indentation of the electrical contact strip arranged with the battery holder for receiving the battery into the battery holder, mechanically contacting the at least one terminal of the battery, and providing mechanical securing force between the battery and the battery holder.

* * * * *

UNITED STATES PATENT AND TRADEMARK OFFICE
CERTIFICATE OF CORRECTION

PATENT NO. : 5,204,985

DATED : April 20, 1993

INVENTOR(S) : Jeffrey S. King

It is certified that error appears in the above-identified patent and that said Letters Patent is hereby corrected as shown below:

Please amend the claims as followed:

Claim 1, column 3, line 46, delete "cooperative" and insert --cooperatively--.

Claim 6, column 4, line 48, delete ""9" and insert --5--.

Signed and Sealed this

Twenty-sixth Day of April, 1994

Attest:

BRUCE LEHMAN

*Attesting Officer*     *Commissioner of Patents and Trademarks*